Dec. 3, 1957     A. R. REEDALL     2,814,904

TACKLE BOX

Filed Oct. 19, 1956

ALLEN R. REEDALL
INVENTOR

BY
ATTORNEY

United States Patent Office 2,814,904
Patented Dec. 3, 1957

2,814,904

TACKLE BOX

Allen Robert Reedall, Rivera, Calif., assignor of one-half to Daryl E. Funderburgh, Downey, Calif.

Application October 19, 1956, Serial No. 617,147

14 Claims. (Cl. 43—54.5)

This invention relates generally to the construction of fishing tackle boxes, and more particularly has to do with the design and arrangement of the box components accomodating ready access to both lures and leaders stored in such manner as to prevent loss or entanglement thereof during box manipulation.

The invention is directed to improvements in that type of tackle box which is carried by a fisherman on his person during fishing so that the lures and leaders in the box are most readily accessible. I am aware that boxes of this general type are well known; however they lack certain features which are the subject of the present invention and which substantially increase the utility and functional purposes of this type of equipment.

Specifically, the invention has to do with the type of tackle box within which a number of lures or flies are contained in compartments that are independently and separately accessible so that a selected lure may be quickly removed from the box when the fisherman so desires. Previous constructions have not made most advantageous use of the leader and lure compartments to the end that the box size may be minimized particularly in the thickness dimension so that most efficient utilization of space has not been achieved with the result that prior containers in which leaders and lures are segregated for independent access have been undesirably bulky. Furthermore, previous tackle boxes have not been designed with sufficient concern for desired simplicity and ease of container component operation required in selecting particular lures and leaders, with the result that they are often lost by dropping out of the box compartments into a stream or on the ground as the fisherman seeks to quickly change a fly or lure.

The present invention seeks to overcome the disadvantages associated with the construction of previous tackle containers, and in so doing provides an annularly compartmented box for confining a large number of lures accessible at one end of the box, and forming a central chamber opening outwardly at the opposite box end for receiving a leader support preferably in the form of a spool, the latter being retained in the chamber against drop-out yet being capable of ready pull-out for gaining quick access to the leaders at the opposite box end. This arrangement provides for maximum utilization of space, enabling a conveniently minimum sized and manipulable container incorporating all the desirable features of lure and leader storage together with many added conveniences to be described.

The box is provided with a cover plate mounted to rotate over the compartments and containing a through passage rotatable into successive registration with independent case compartments while the other compartments remain covered, the invention particularly contemplating the use of detenting means resisting cover rotation whenever the passage is in compartment registration so that a lure once removed from a particular compartment may be directly replaced in that compartment without requiring turning of the cover such as might cause the loss of other lures from other compartments. The cover itself remains out of engagement with the partitions separating the compartments so that it may freely be turned except for the action of the detenting means, and the latter which is carried by the cover extends in interfitting relation with successive partitions for resisting cover rotation whenever the opening is in compartment registration. The detenting means preferably comprises a cam extending insufficiently below the level of successive partition edges that the cover is not resiliently deflected away from such edges out of lure confining relation therewith when the cam is rotated over the edges.

These and other features and objects of the invention, as well as the details of an illustrative embodiment, will be more fully understood from the following detailed description of the drawing, in which.

Figure 1:
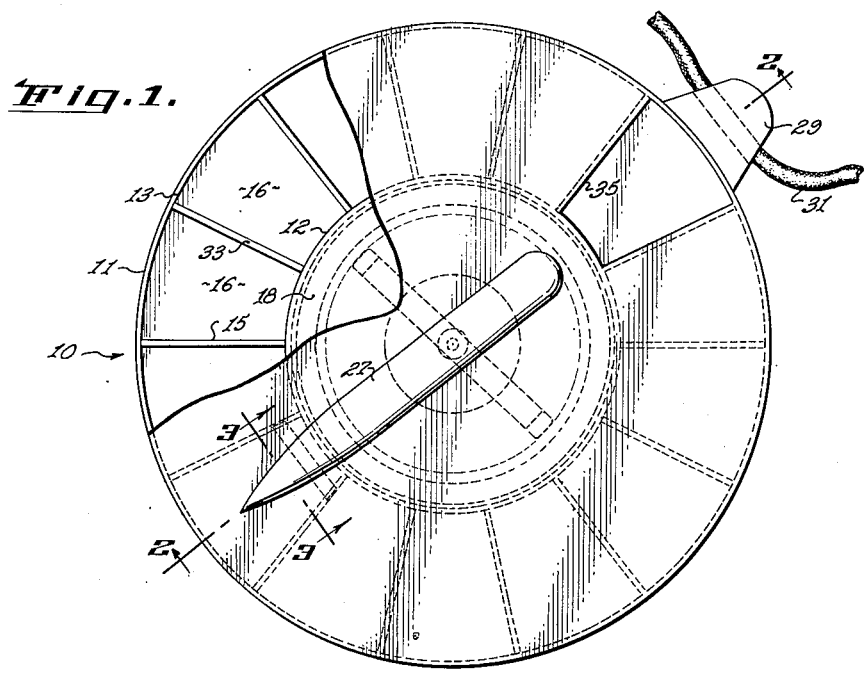
Fig. 1 is a plan view of the tackle box broken away to show the interior construction thereof.

The tackle box indicated generally at 10 includes an annular case 11 and inner and outer cylindrical walls 12 and 13 respectively interconnected by an integral bottom wall 14 and integral radially extending partitions 15 spaced about the annulus to form a large number of lure compartments 16 occupying the entire annular extent of the case except for the partitions for storing a maximum number of lures. The case forms a central cylindrical chamber 17 closed over its upper end 18 and opening outwardly at 19 at the case bottom for receiving a cylindrical spool 20 through the opening into the chamber, as will be described.

A screw fastener 21 having an unthreaded shank portion 22 extending upwardly from the screw head loosely through openings 23 and 24 in a flat spring 25 and the closed end 18 of the case, respectively, is centrally or axially threaded into a thin cover plate 26 and into a narrow elongated handle 27, thereby holding the cover loosely against the closed end wall 18 and the handle tightly against the cover. All of the box components including the case, cover, spool and handle may be made of a light-weight transparent plastic material such as polyethylene to be conveniently molded and so that the contents of the box may be readily viewed through the cover and case and from opposite ends of the box. Suitably molded with the case is a lug 29 projecting radially outwardly from wall 13 and containing a bore 30 receiving an endless cord 31 which the fisherman may hang over his shoulder or about his neck so that the transparent box is readily accessible at the fishing location.

The circular cover plate extends transversely over the open upper ends of the compartments above the lip of the cylindrical outer wall 13 of the case, with a slight clearance therebetween to prevent frictional drag as the cover is rotated. Likewise and for the same reason, there is clearance at 32 between the cover and the upper edges 33 of the partitions; however, the clearance 32 is sufficient not only to prevent frictional drag but also to provide room for passage of a detent in the form of a cam 34 connected to the underside of the cover over the edges of the partitions in interfering relation therewith, which, while sufficient to cause upward deflection or bending of the cover over the detent away from the partition edges is insufficient in relation to the detent depth to bring about resilient deflection of the cover out of lure confining relation with the partitions and the outer wall lip. In other words, the lures in the compartments remain confined therein during cover rotation even though they may be quite flat, since the clearance 32 between the cover and the partition edges 33 is never sufficient for catching the lures therein.

Figure 2:
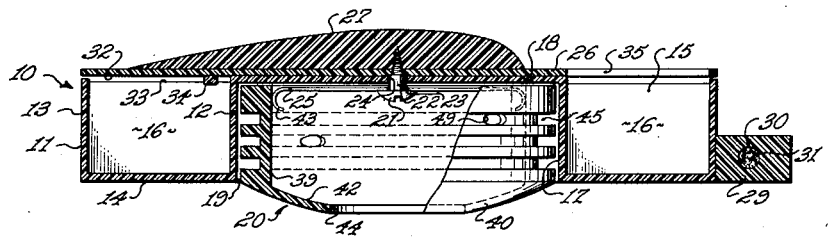
Fig. 2 is a section taken on line 2—2 of Fig. 1.
Figure 3:
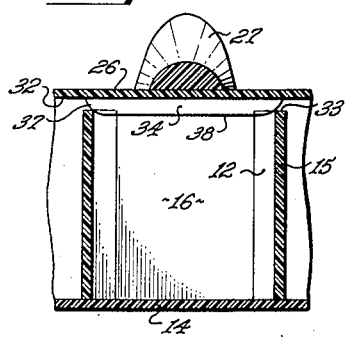
Fig. 3 is an enlarged section taken on line 3—3 of Fig. 1.

The purpose of the detent 34 is to interfit between successive partitions 15 holding the cover against rotation when a sector shaped passage 35 in the cover is in registration with one of the compartments 16 as shown in Fig. 1, thereby enabling removal of a fly from that compartment and its replacement therein after using the fly without danger of inadvertent cover rotation bringing the opening 35 into registration with another compartment with possible loss of the lure therefrom. Thus, no auxiliary closure for the opening 35 is needed. The detent 34 may comprise a piece of plastic bonded to the underside of the cover, and its shape is shown in Figs. 1 through 3, being elongated in the direction of cover rotation, with opposite upward sloping ends 37 engaging the edges of successive partitions, and bottoms 38 of the cam extending slightly below the level of these partition edges so as to interfere therewith upon cover rotation. The latter movement causes the cam to ride up onto and over a partition edge, effecting upward resilient deflection of the plate so that the cam is urged downwardly between the next pair of partitions in detenting relation therewith as the opening 35 in the cover is brought into registration with another compartment.

The plastic spool 20 includes a thickened cylindrical outer wall 39 and a bottom wall 40 forming an interior hollow 42 opening upwardly toward the closed end 18 of the case opening for reception over the curved opposite ends 43 of the flat spring 25 for pressing engagement against the inside of the spool wall 39. Thus, the spring ends act to frictionally hold the spool end in the chamber 17 against drop-out therefrom, while accommodating pull-out removal therefrom as by inserting a finger through central aperture 44 in the spool bottom wall 40 and thereafter pulling outwardly against that wall.

Figures 4, 5:
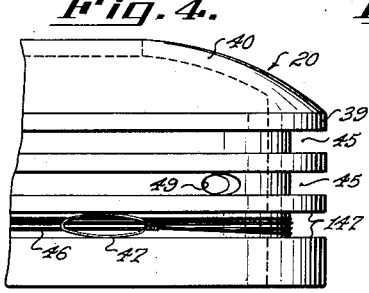
Fig. 4 is an enlarged view of a portion of the leader winding spool.
Fig. 5 is a section taken through the spool showing a leader hook confined within the hollow thereof.

Formed by or sunk into the thickened outer spool wall 39 are a series of axially spaced annular recesses 45 for independently confining leaders as shown at 46 wrapped about the spool with the looped leader ends 47 compressed between opposite sides 147 in the recesses, as shown in Fig. 4. Should the leaders become unwound in the recesses, they remain confined by the inner wall 12 of the case extending closely adjacent the thickened spool wall 39.

The hollow interior of the spool is adapted to receive hooks 48 connected to the ends of the leaders passing through ports 49 formed in the spool wall as seen in Fig. 5, the location of the ports with respect to the aperture 44 in the spool bottom wall being such that the hooks generally lie outside and above the zone occupied by a finger inserted through the aperture to pull out the spool from the case. Also, the flat spring lying flatly against the closed upper end 18 of the opening 17 above the level of the openings 49 is not engaged by the hooks so that inadvertent catching of the hooks is prevented.

I claim:

1. An improved tackle box, comprising an annular case having an upper open end, a closed lower end and partitions forming a plurality of radially arranged lure compartments between said ends, said case having an inner wall defining a central chamber opening outwardly at said lower end, a cover plate mounted on the case to rotate over said compartments at the case upper end and containing a passage therethrough, said cover being rotatable to bring said passage into successive registration with individual case compartments while the other compartments remain substantially covered, detent means resisting cover rotation whenever the said passage is in compartment registration, and leader support means detachably received through said central opening for confining leaders within the chamber and frictionally retained therein against drop-out from the chamber to permit pull-out removal thereof from the case lower end, whereby lures and leaders are readily accessible at opposite ends of said box.

2. An improved tackle box, comprising an annular case having an upper open end, a closed lower end and partitions forming a plurality of radially arranged lure compartments between said ends, said case having an inner wall defining a central chamber opening outwardly at said lower end, a transparent plastic cover plate mounted on the case to rotate over said compartments at the case upper end and containing a passage therethrough, said cover being rotatable to bring said pressure into successive registration with individual case compartments while the other compartments remain substantially covered, detent means carried by said cover plate extending in interfitting relation with successive partitions and resisting cover rotation whenever the said passage is in compartment registration, and leader support means detachably received through said central opening for confining leaders within the chamber and frictionally retained therein against drop-out from the chamber to permit pull-out removal thereof from the case lower end, whereby lures and leaders are readily accessible at opposite ends of said box.

3. An improved tackle box, comprising an annular case having an upper open end, a closed lower end and partitions forming a plurality of radially arranged lure compartments between said ends, said case having an inner wall defining a central chamber opening outwardly at said lower end, a cover plate mounted on the case to rotate over said compartments at the case upper end and containing passage therethrough, said cover being rotatable to bring said passage into successive registration with individual case compartments while the other compartments remain substantially covered, detent means carried by the cover resisting cover rotation whenever the said passage is in compartment registration, a hollow leader support means detachably received through said central opening and in the chamber for confining leaders with hooks connected thereto respectively wound on said support means and received therein, and means frictionally retaining said support means in the chamber against drop-out therefrom and permitting pull-out removal from the case lower end, whereby lures and leaders are readily accessible at opposite ends of said box.

4. An improved tackle box, comprising an annular case having an upper open end, a closed lower end and radially extending partitions forming a plurality of radially arranged lure compartments between said ends, said case forming a circular central chamber closed at said upper end and opening outwardly at said lower end, a transparent plastic circular cover plate mounted on the case to rotate over said compartments at the case upper end and containing a through passage, said cover being rotatable to bring the said passage into successive registration with individual case compartments while the other compartments remain substantially covered, detent means carried by said cover plate to be rotated into and over the edges of successive partitions and to interfit between successive partitions resisting cover rotation whenever said passage is in compartment registration, a hollow spool inserted through said central opening into the chamber for confining leaders with hooks connected thereto respectively wound on the spool and received in the spool hollow, and means retaining said spool in the chamber against drop-out therefrom and for pull-out removal from the case lower end, whereby lures and leaders are readily accessible at opposite ends of said box.

5. The invention as defined in claim 4 comprising a transparent plastic case and spool.

6. The invention as defined in claim 5 in which the cover extends in a plane closely spaced from the partition edges so that the cover remains out of engagement therewith during said rotation and the lures in said covered compartments remain confined therein.

7. The invention as defined in claim 6 comprising a cam on said cover extending insufficiently below the level of successive partition edges that the cover is not resiliently deflected away from said partition edges out of lure confining relation therewith when said cam is rotated thereover.

8. The invention as defined in claim 5 in which said spool forms a plurality of annular peripheral recesses into which separate leaders may be wound.

9. The invention as defined in claim 8 in which the spool forms apertures communicating between said recesses and the spool hollow and through which said hooks are insertible into said hollow.

10. The invention as defined in claim 5 in which the spool has a closed lower end and an open upper end through which the hooks in said hollow are accessible after the spool is removed from said case.

11. The invention as defined in claim 10 in which said spool closed end forms a central port sized for finger insertion therethrough for pulling the spool out of said case opening.

12. The invention as defined in claim 10 including a spring releasably holding the spool in said opening.

13. The invention as defined in claim 12 comprising a flat spring pressing against the spool inside.

14. The invention as defined in claim 13 including a fastener holding said spring and cover at opposite sides of the case wall closing the upper end of said central opening.

References Cited in the file of this patent

UNITED STATES PATENTS 2,517,867     Glahn ------------------ Aug. 8, 1950